(12) United States Patent
Strand

(10) Patent No.: US 9,564,748 B2
(45) Date of Patent: Feb. 7, 2017

(54) INCLINED CONDUCTOR DEVICE

(71) Applicant: NeoDrill AS, Algard (NO)

(72) Inventor: Harald Strand, Algard (NO)

(73) Assignee: NeoDrill AS, Algard (NO)

( * ) Notice: Subject to any disclaimer, the term of this patent is extended or adjusted under 35 U.S.C. 154(b) by 27 days.

(21) Appl. No.: 14/762,369

(22) PCT Filed: Jan. 22, 2014

(86) PCT No.: PCT/NO2014/050012
§ 371 (c)(1),
(2) Date: Jul. 21, 2015

(87) PCT Pub. No.: WO2014/116119
PCT Pub. Date: Jul. 31, 2014

(65) Prior Publication Data
US 2015/0372470 A1 Dec. 24, 2015

(30) Foreign Application Priority Data

Jan. 28, 2013 (NO) .................................... 20130149

(51) Int. Cl.
*H02G 9/10* (2006.01)
*H02G 9/02* (2006.01)
(Continued)

(52) U.S. Cl.
CPC .................. *H02G 9/10* (2013.01); *E21B 7/043* (2013.01); *E21B 19/24* (2013.01); *E21B 41/08* (2013.01); *E21B 43/017* (2013.01); *H02G 9/02* (2013.01)

(58) Field of Classification Search
CPC .............. H02G 9/10; H02G 9/02; H02G 9/06; H02G 9/065; H02G 9/00; H02G 15/00; H02G 15/007; E21B 7/043; E21B 7/046; E21B 7/04; E21B 15/04; E21B 19/24; E21B 41/08; E21B 43/017
(Continued)

(56) References Cited

U.S. PATENT DOCUMENTS 4,223,737 A * 9/1980 O'Reilly ................. E21B 7/043
166/336
6,198,871 B1 * 3/2001 Gregor ..................... H02G 9/06
385/134
(Continued)

FOREIGN PATENT DOCUMENTS

| GB | 1399715 | 7/1975 |
|---|---|---|
| GB | 2000211 A | 1/1979 |
| GB | 2170842 A | 8/1986 |

OTHER PUBLICATIONS

International Search Report and Written Opinion for PCT/NO2014/050012 dated May 5, 2014.

*Primary Examiner* — Angel R Estrada
(74) *Attorney, Agent, or Firm* — Andrus Intellectual Property Law, LLP

(57) ABSTRACT

A conductor arrangement is for a collection of subterranean wells for recovering fluids from an underground structure. A frame is provided with several conductor guides, each forming an inlet opening for a conductor in an upper portion of the frame and an outlet opening for the conductor in a lower portion of the frame. The conductor is arranged to border a portion of a borehole towards a surrounding unconsolidated mass and has been passed through the conductor guide and down into the unconsolidated mass. The conductor guides are arranged in a mutually diverging manner in the direction from the inlet opening, and each conductor is extendable by a bend, the deflection angle of the bends
(Continued)

providing mutually parallel center axes in coupling interfaces arranged in upper end portions of the bends.

8 Claims, 5 Drawing Sheets

(51) Int. Cl.
*E21B 43/017* (2006.01)
*E21B 7/04* (2006.01)
*E21B 19/24* (2006.01)
*E21B 41/08* (2006.01)

(58) Field of Classification Search
USPC ....... 174/370, 32, 350, 366, 135; 405/184.4, 405/184.5, 154.1
See application file for complete search history.

(56) References Cited

U.S. PATENT DOCUMENTS

| | | | |
|---|---|---|---|
| 6,923,099 B2* | 8/2005 | Rugg | B26F 1/32 30/123 |
| 6,979,776 B1* | 12/2005 | Zimmermann | H02G 9/06 174/37 |
| 7,036,223 B2* | 5/2006 | Kauranen | H02G 9/10 29/854 |
| 7,862,257 B2* | 1/2011 | Jeong | H02G 9/10 226/189 |
| 8,056,251 B1 | 11/2011 | Oglesby | |

* cited by examiner

INCLINED CONDUCTOR DEVICE

CROSS-REFERENCE TO RELATED APPLICATIONS

This application is the U.S. national stage application of International Application PCT/NO2014/050012, filed Jan. 22, 2014, which international application was published on Jul. 31, 2014, as International Publication WO2014/116119 in the English language. The international application is incorporated herein by reference, in entirety. The international application claims priority to Norwegian Patent Application No. 20130149, filed Jan. 28, 2013, which is incorporated herein by reference, in entirety.

FIELD

A conductor arrangement for a collection of underground wells for recovering fluids from an underground structure is described, in which a frame is provided with several conductor guides extending between an upper portion and a lower portion of the frame, and conductors that are arranged to border a portion of a borehole towards a surrounding unconsolidated mass have been passed through the conductor guide and down into the unconsolidated mass.

BACKGROUND

When establishing wells for the production of fluids from subterranean structures, especially where there will be production from subsea wells to installations projecting above a sea surface, and the wells and the surface installation are connected via risers, it is a challenge to establish the wells with some distance in the structures covering the fluid-producing structures. It is desirable that the risers are parallel and, because of the limited size of the surface installation, it is necessary for the horizontal spacing of the risers to be relatively small.

When a borehole is being established, for example for a well, conductors are set down through at least the upper part of the unconsolidated masses covering the bedrock, which is to be drilled. The conductor borders the borehole towards the unconsolidated masses and prevents these from coming into contact with casing, drill pipes, production tubing and so on extending permanently or in periods between the surface installation and the well, possibly between a wellhead and the well. It is known within the art to give the lower portion of the conductor, that is to say the so-called conductor shoe, an asymmetrical form so that while being driven in, it will deflect in a desired direction. Still, the results achieved are often encumbered with large deviations from what was planned. Experience has shown that the greatest precision is achieved when the conductor is driven rectilinearly. The driving-in of conductors is usually done through guides that are arranged in a frame standing on the surface of the unconsolidated masses, that is to say on the sea floor when subsea wells are being established.

The prior art in this field utilizes a frame with parallel guides to provide parallelism between the risers that extend further up to the surface installation.

SUMMARY

The invention has for its object to remedy or reduce at least one of the drawbacks of the prior art or at least provide a useful alternative to the prior art.

The object is achieved through features, which are specified in the description below and in the claims that follow.

A frame device is provided for a collection of subterranean wells for recovering fluids from an underground structure, wherein, in the frame, which is arranged to be placed on a portion of the surface of an unconsolidated mass overlying the underground structure, several conductor guides are fixed for conductors that, when a well is being established, are driven down into the unconsolidated mass to border boreholes towards the unconsolidated mass. The conductor guide forms an inlet opening for a conductor in an upper portion of the frame and an outlet opening for the conductor in a lower portion of the frame, and at least some of the conductor guides are arranged in such a way that the direction of a conductor that is passed through a conductor guide diverges relative to the directions of neighbouring conductors. The frame may be a well frame or form parts of a well frame, which is used as a foundation for wellheads, blow-out preventers and so on when the well structures are being constructed.

For example, by a centre distance of 2.5 meters between two inlet openings and with an angling of $+1°$ and $-1°$, there will be a centre distance of about 4.5 meters between two straight conductors already at 60 meters' depth below the inlet openings. The conductor guides may be formed as elongated guide elements extending through the frame, for example in the form of straight pipes.

In a preferred embodiment, the conductor guide is sectioned, an upper guide element being releasably attached to the upper frame portion. In this embodiment, the upper frame portion is provided with several cut-outs arranged to receive the upper guide element. The upper guide element may be placed in various positions in the upper frame portion, the cut-outs being of an identical shape. In this embodiment, the upper frame portion is advantageously formed as a horizontal grid. An advantage of this embodiment is that the first guide element may be removed from the upper portion of the frame when the conductor has been stabilized by having been driven sufficiently far down into the unconsolidated mass. After that, the conductor may be driven so far down that the upper end portion of the conductor is arranged between the upper and lower frame portions, preferably near the lower portion of the frame. In an advantageous embodiment, the lower frame portion may also be formed with several cut-outs, for example as a horizontal grid. In this embodiment, a lower portion of the sectioned conductor guide may be formed as a lower guide element, which is arranged in a corresponding cut-out in the lower frame portion. The lower guide element may be releasably attached in the lower frame portion.

The upper and lower guide elements are provided with abutment portions that are arranged to rest supportingly against the side edges of the corresponding cut-out of the upper and lower frame portions respectively. A through-going pipe lead-through that can abut supportingly against a conductor is located and has a centre-axis direction in accordance with the desired conductor angle and the vertical distance of the corresponding cut-outs and their horizontal positioning relative to each other.

After the conductors have been driven down and the upper end portion projecting above the upper, possibly the lower, portion of the frame has been adapted to receive other well components, for example adjusted in length and/or attached to the frame, each conductor is extended by a bend with a bending radius matched to the angling of the relevant conductor, so that the upper ends of all the bends coincide in direction. The length of the bends is typically about 10 meters and they may be formed by, for example, induction-bending so that a circular cross section is maintained in the entire length of the bend. The joint between the conductor and the bend is made fluid-tight, for example by the use of a so-called swaging technique in which, during the joining, outward grooves are formed in the pipe wall, as these are pressed into internal grooves in a connecting coupling.

When the frame is provided with sectioned conductor guides, each bend may be attached in the cut-out of the upper frame portion, for example by means of a fastener of the same kind as the upper guide element removed; however, the positioning and locating of the pipe lead-through have been adapted to the bending angle and position of the bend in the collection of conductors.

The invention relates more specifically to a conductor arrangement for a collection of subterranean wells for recovering fluids from an underground structure, in which a frame is provided with several conductor guides that each form an inlet opening for a conductor in an upper portion of the frame and an outlet opening for the conductor in a lower portion of the frame, and the conductor which is arranged to border a portion of a borehole towards a surrounding unconsolidated mass has been passed through the conductor guide and down into the unconsolidated mass, characterized by the conductor guides being arranged in a mutually diverging manner in the direction from the inlet opening, and each conductor is extendable by a bend, the deflection angles of the bends providing mutually approximately parallel centre axes in connection interfaces arranged in upper end portions of the bends.

The conductor guides may be rectilinear.

The axial direction of each conductor guide may diverge by 1-3° relative to adjacent conductor guides.

The cross section of the bend may be identical to the cross section of the conductor.

The bend may be formed by induction-bending a tubular body.

The conductor and the bend may be joined in a fluid-tight manner by means of a connecting coupling.

The conductor guide may be sectioned, an upper guide element forming the inlet opening and being releasably arranged in a cut-out in the upper portion of the frame.

The upper portion of the frame may be formed as a grid, the grid openings forming cut-outs which are each arranged to receive a releasable upper guide element.

The bend may be held fixed in the upper portion of the frame by means of a fixing element arranged in a cut-out in the upper portion of the frame.

The fixing element for holding a bend fixed may be arranged in the same cut-out as the upper guide element for a corresponding conductor.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
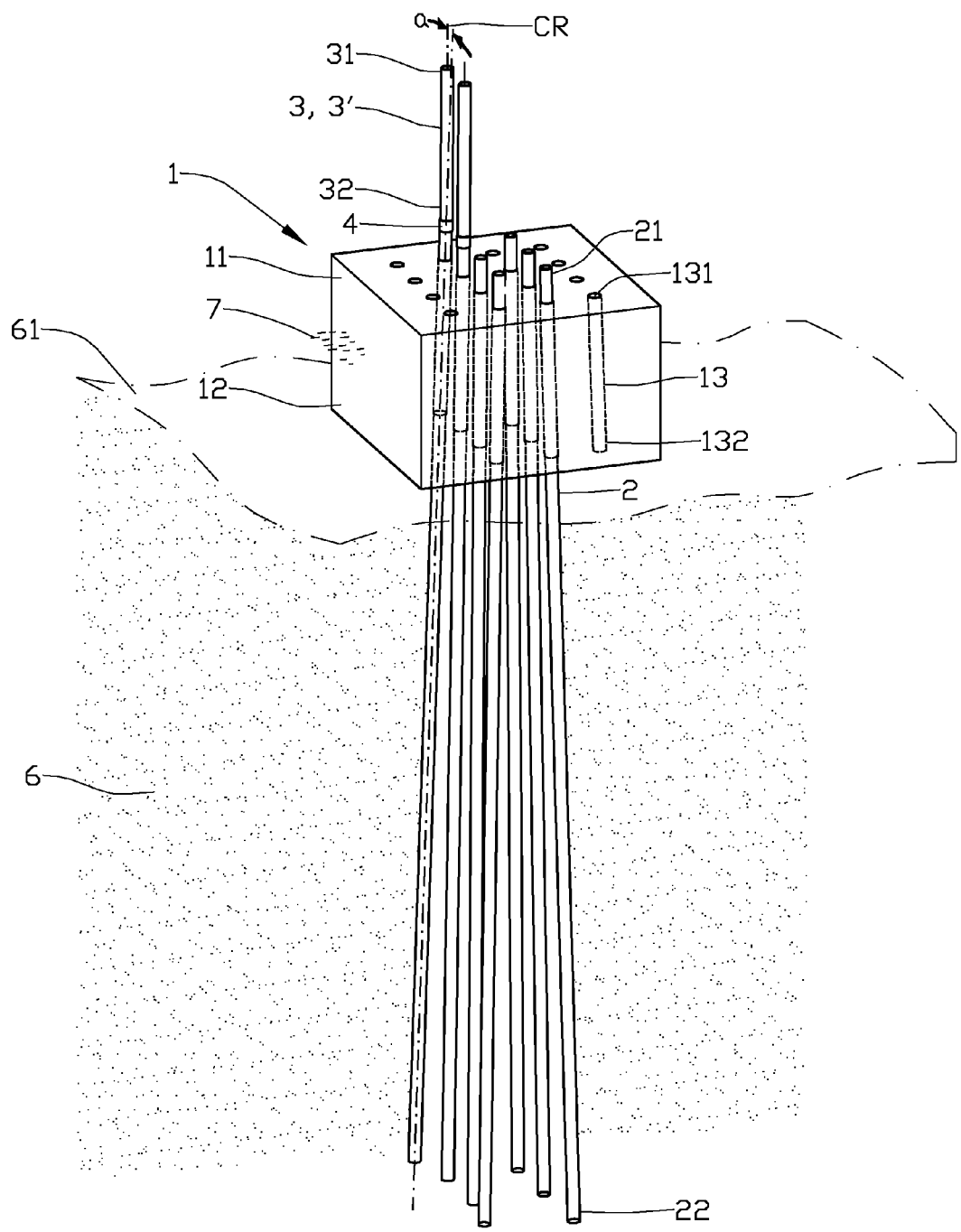
FIG. 1 shows a principle drawing of a frame placed on a seabed, in which some conductor guides are shown, several conductors having been driven down into an underlying unconsolidated mass, and two of the conductors having been extended by bends for connection to parallel risers.

A frame 1 which is arranged to rest stably on a sea floor 61 is provided with several conductor guides 13 extending through the frame 1 from an upper portion 11 to a lower portion 12, an upper guide mouth 131 being arranged in the upper frame portion 11 and a lower guide portion 132 forming a lower end of the conductor guide 13. The conductor guides 13 are rigidly attached to the frame 1, diverging relative to each other in the direction from the upper guide mouths 131 by an angle of 1-3°. In the exemplary embodiment shown in FIG. 1, the conductor guides 13 are sloping more and more the longer their distances from the centre of the frame 1, but it lies within the scope of the invention for the sloping to be arranged in a different manner. The internal diameter of the conductor guide 13 corresponds to the external diameter of a corresponding conductor 2 which is to be passed through the conductor guide 13 with a prescribed clearance in accordance with dimensional tolerances for the conductor 2 and conductor guide 13 and in accordance with the directional precision prescribed by the operator for the collection of boreholes. A person skilled in the art will have knowledge about acceptable tolerances.

The frame 1 is placed on the sea floor 61 over an unconsolidated mass 6. To a person skilled in the art, it will be obvious to provide the frame 1 with means (not shown) providing for the frame 1 to lie stably and in a prescribed orientation, for example horizontally. The design of the frame 1 may depend on the nature of the seabed, for example when it comes to evenness, gradient of slope and firmness.

A conductor 2 which is to be arranged in the unconsolidated mass 6 in a manner known per se in order to border an upper portion of a borehole (not shown) towards the unconsolidated mass 6 is passed through a conductor guide 13 which thereby provides for the conductor 2 to be placed in the unconsolidated mass in a prescribed direction relative to other conductors 2. The conductor 2 is positioned by driving or rotating in a rectilinear movement, for example.

Figures 2, 3:
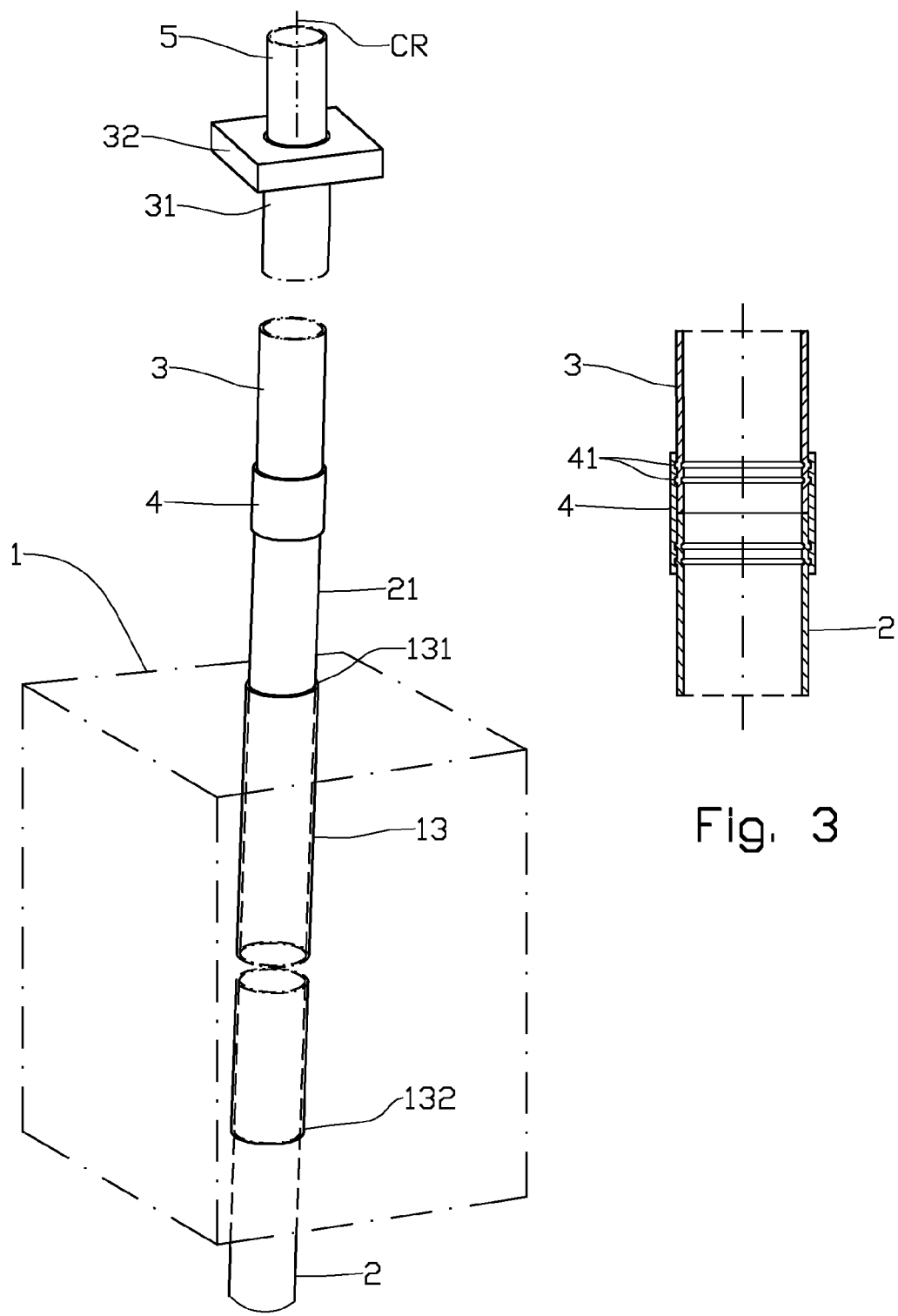
FIG. 2 shows a section on a larger scale of the frame with a conductor passed down through a conductor guide and connected to a bend by means of a connecting coupling.
FIG. 3 shows an axial section on a larger scale through a joint between a conductor and a bend.
Figure 4:
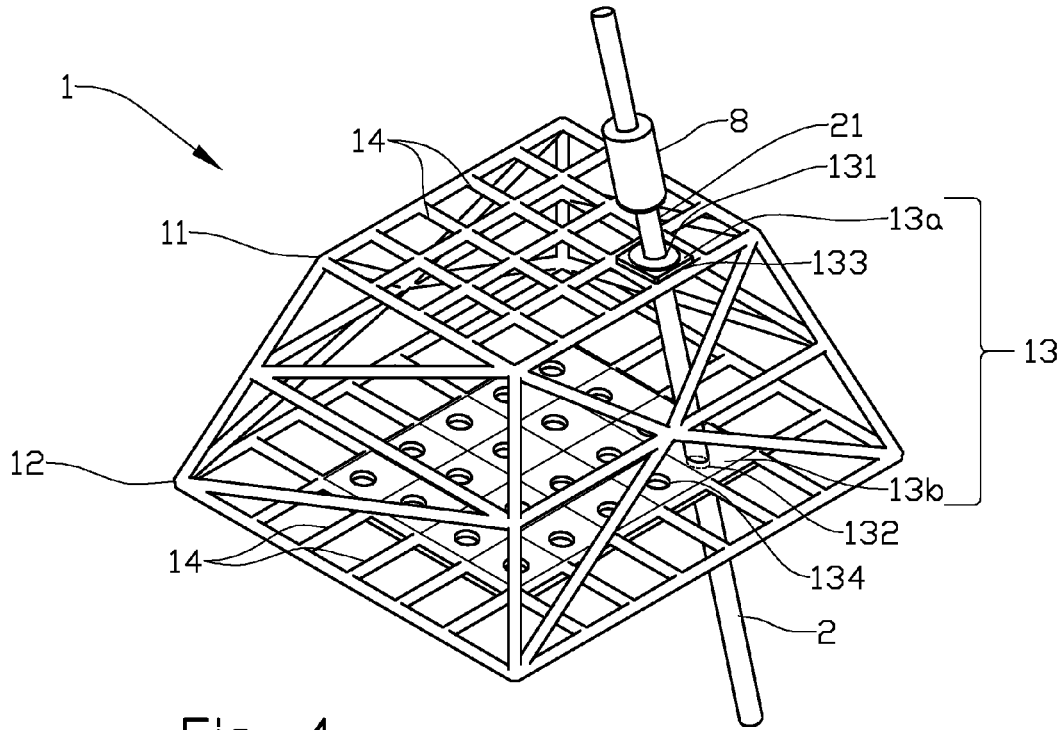
FIG. 4 shows an alternative embodiment of the frame, in which upper and lower portions of the frame form a grid with cut-outs for receiving guide elements, and a conductor is being driven down into the unconsolidated mass.

The upper end 21 of the conductor 2 projects above the frame 1. A bend 3 with a deflection angle α corresponding to the slope of the conductor 2 is connected to the conductor 2 by means of a connecting coupling 4. In an upper end portion 31, the bend 3 is provided with a coupling interface 32 (see FIG. 2) for connection to a riser 5. The coupling interface 32 may be a prior-art wellhead with blow-out preventers and so on. The bends 3 of the different conductors 2 have a deflection angle α which provides for the centre axis CR in the coupling interface 32 for each bend 3 to have approximately the same direction. Thereby, all the risers 5 will be approximately parallel.

The bend 3 exhibits a circular cross section in its entire length. This is achieved by induction-bending for example.

Here, the conductor 2 and the bend 3 are shown joined by means of the connecting coupling 4. This is shown only as an example of joining, the essential thing being that there are no substantial, internal cross-sectional restrictions in the joint. In the embodiment shown, according to FIG. 3, the connecting coupling 4 is provided with several internal grooves 41, and portions of the walls of the conductor 2 and the bend 3 have been squeezed into the grooves 41, for example by rolling.

Reference is now made to FIGS. 4-7 which show an alternative embodiment of the conductor arrangement. The frame 1 is formed as a truss-work structure in which, in the upper and lower frame portions 11, 12, several cut-outs 14 have been formed, shown here as openings in crossbarred upper and lower frame portions 11, 12.

The cut-outs 14 are arranged to receive sectioned conductor guides 13, more specifically upper guide elements 13a arranged in the upper frame portion 11 and corresponding lower guide elements 13b arranged in the lower frame portion 12. The guide elements 13a, 13b are provided with abutment portions 133 that abut supportingly against the side edges of the cut-outs 14. The guide elements 13a, 13b and the cutouts 14 are arranged in such a way that the centre axis through pipe lead-throughs 134 in guide elements 13a, 13b belonging together in a pair exhibits a prescribed angle of slope. A conductor 2 is lowered through a set of guide elements 13a, 13b and driven down into the unconsolidated masses 6 by means of a driving device known per se, for example a hammer arrangement 8. To achieve a sufficient spreading of the wells (not shown) that are to be established, it is obvious to let the axial direction of each conductor guide 13 diverge relative to the centre axes of adjacent conductor guides 13, typically by 1-3°.

Figure 5:
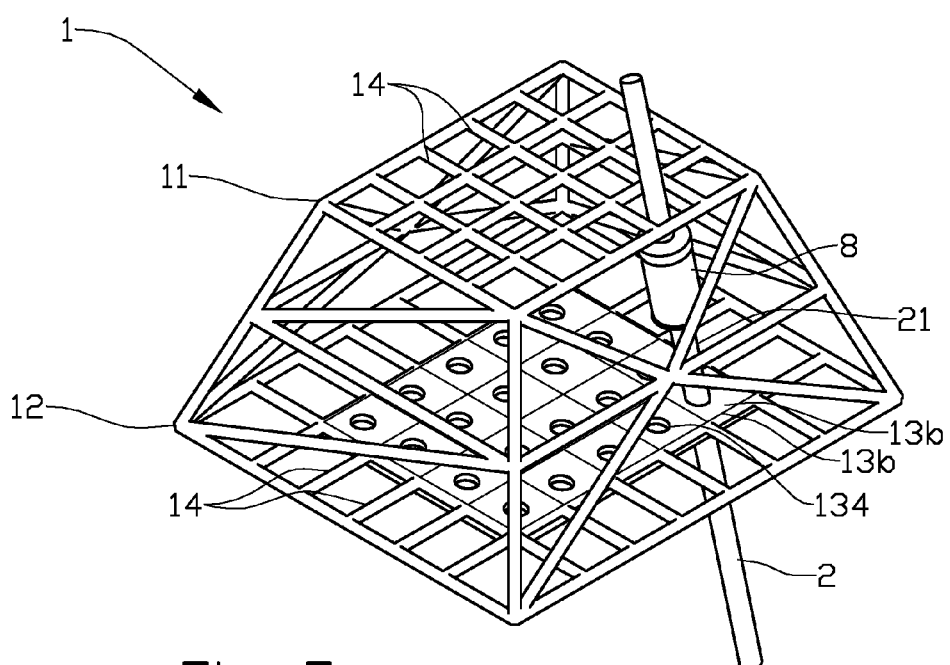
FIG. 5 shows the conductor after an upper guide element has been removed and the upper portion of the conductor is being driven down towards a lower guide element.
Figure 6:
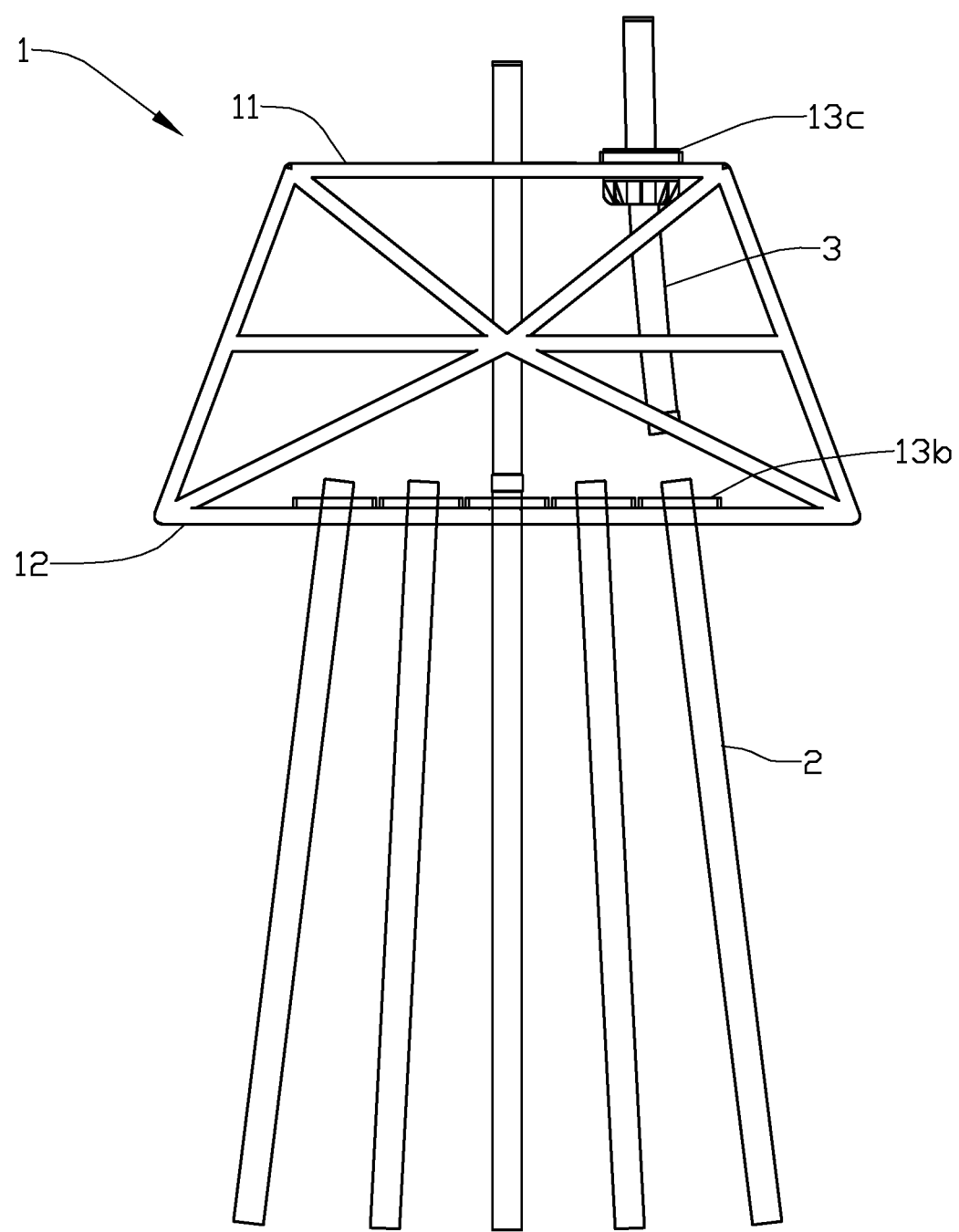
FIG. 6 shows a phase in the connection of conductors and bends in the frame according to FIG. 4, in a side view.
Figure 7:
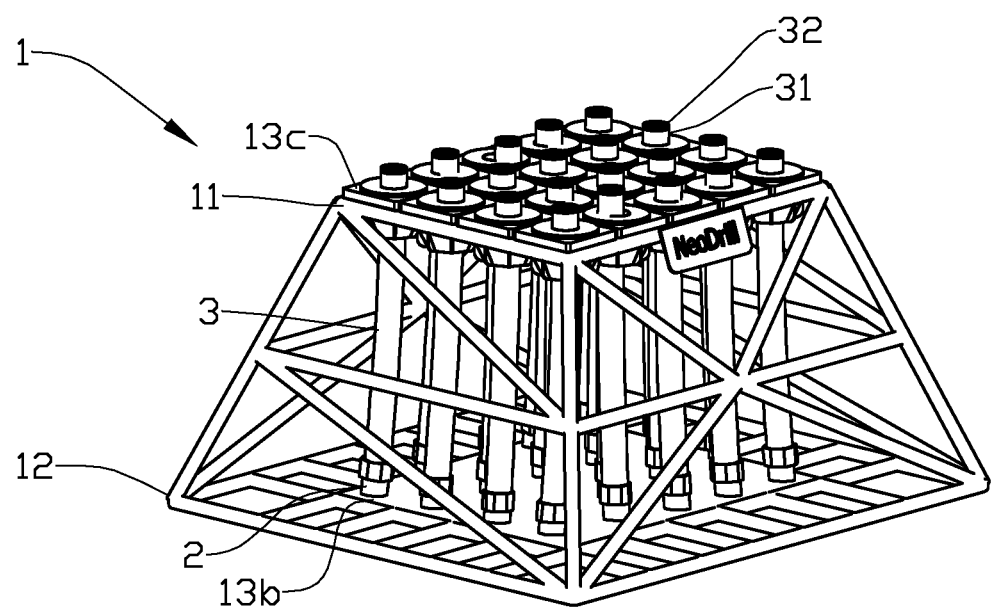
FIG. 7 shows a conductor arrangement prepared in the frame according to FIG. 4.

Reference is now made to FIG. 5 in particular. The upper guide element 13a has been removed, and the upper end 21 of the conductor 2 is driven down towards the lower guide element 13b, the cut-outs 14 of the upper frame portion 11 being arranged in such a way that the hammer arrangement 8 may pass in between the cutouts 14 of the upper frame portion 11.

In this embodiment of the frame 1 and the conductor guide 13, the bend 3 and the conductor 2 can be connected inside the frame 1. The corresponding cut-out 14 of the upper frame portion 11 forms an abutment for a fixing element 13c which at least gives the bend 3 lateral support. The bend 3 may be rigidly connected to the upper frame portion 11 via the fixing element 13c. Beyond the advantage of the bend 3 being given lateral support, this embodiment has the advantage of the conductor arrangement exhibiting a moderate building height substantially determined by the length of the bends 3.

With a conductor arrangement according to the invention, diverging conductors 2 may be set with a great degree of precision without the use of complicated technology to guide the conductor 2 in the desired direction, for example by the conductor 2 being provided with an asymmetrical conductor shoe that gives the conductor 2 a deflection as it is driven down into the unconsolidated mass 6.

The invention claimed is:

1. A conductor arrangement for a collection of subterranean wells for recovering fluids from an underground structure, in which a frame is provided with several conductor guides, each forming an inlet opening for a conductor in an upper portion of the frame and an outlet opening for the conductor in a lower portion of the frame, and the conductor, which is arranged to border a portion of a borehole towards a surrounding unconsolidated mass has been passed through the conductor guide and down into the unconsolidated mass, and the conductor guides are arranged in a mutually diverging manner in the direction from the inlet opening, and each conductor is extendable by a bend, the deflection angles of the bends providing mutually approximately parallel center axes in coupling interfaces arranged in upper end portions of the bends, wherein the conductor guide is sectioned, an upper guide element forming the inlet opening and being releasably arranged in a cut-out in the upper portion of the frame, and the upper portion of the frame being formed as a grid, the grid openings forming cut-outs which are each arranged to receive a releasable upper guide element.

2. The conductor arrangement in accordance with claim 1, wherein the conductor guides are rectilinear.

3. The conductor arrangement in accordance with claim 1, wherein the axial direction of each conductor guide diverges by 1-3° relative to the center axes of adjacent conductor guides.

4. The conductor arrangement in accordance with claim 1, wherein the cross section of the bend is identical to the cross section of the conductor.

5. The conductor arrangement in accordance with claim 1, wherein the bend is formed by an induction bending of a tubular body.

6. The conductor arrangement in accordance with claim 1, wherein the conductor and the bend are joined in a fluid-tight manner by a connecting coupling.

7. The conductor arrangement in accordance with claim 1, wherein the bend is held fixed in the upper portion of the frame by a fixing element arranged in a cut-out in the upper portion of the frame.

8. The conductor arrangement in accordance with claim 7, wherein the fixing element for holding a bend fixed is arranged in the same cut-out as the upper guide element for a corresponding conductor.

* * * * *